Patented Aug. 20, 1940

2,211,931

UNITED STATES PATENT OFFICE 2,211,931

CELLULOSIC PRODUCT AND PROCESS FOR PREPARING SAME

Emmette F. Izard, Kenmore, N. Y., assignor to E. I. du Pont de Nemours & Company, Wilmington, Del., a corporation of Delaware No Drawing. Application June 23, 1937, Serial No. 149,923

25 Claims. (Cl. 18—54)

This invention relates to new compositions of matter, particularly to compositions of matter comprising cellulosic structures and still more particularly to compositions of matter comprising cellulosic structures which have been rendered substantially repellent to water.

It is well known that cellulose solutions such as viscose can be modified with a number of kinds of materials to give regenerated cellulose containing a modifier and that these modified cellulosic structures possess particular properties for special uses. As an example, it is known that viscose can be modified with emulsions of wax or with resins, and this modified viscose spun into filaments. However, this known procedure has not resulted in the production of water-repellent cellulosic products.

An object of this invention is the preparation of cellulosic structures. A further object is the preparation of cellulosic structures so modified that they are rendered substantially repellent to water. A still further object is the preparation of these cellulosic structures in the form of filaments, threads, films or pellicles which are substantially repellent to water.

These objects are accomplished in general by commingling a wax and a resin in a cellulosic solution, the resin being soluble in said solution, the wax preferably being introduced into the cellulosic solution in the form of an aqueous emulsion, and the resin preferably introduced in the form of a solution in a solvent miscible with the cellulosic solution. The cellulosic solutions so modified are then spun into filaments or cast into films according to conventional methods, subjected, if desired, to subsequent processing, and dried. The dried threads or films are then subjected to a temperature in excess of the melting point of the wax for a period of time sufficient to flux the wax. This may conveniently be done by continuing the subjection of the threads or films to drying conditions (i. e. a relatively high temperature) for a short period of time after the drying is completed. According to the preferred embodiment of the invention, viscose is modified by the incorporation of an aqueous emulsion of a high melting point wax (e. g., having a melting point of 65° C.) and an aqueous caustic soda solution of a caustic soluble diphenylolpropane formaldehyde resin (diphenylol dimethylmethane condensed with formaldehyde), the wax emulsion and resin solution being preferably introduced into the viscose at the same time, the modified viscose, for example, being spun into filamentary form, and then dried at elevated temperatures to produce threads which are extremely water repellent. On the contrary, if the wax emulsion is introduced into the viscose without the introduction of the resin, filaments spun from the modified viscose are very easily wetted with water and the same is true if the resin solution is introduced into the viscose without incorporating the wax.

The quantity of resin and wax introduced into the cellulosic solution should not be so great as to extensively weaken the resulting products. On the other hand, in order to secure the most effective water repellence, the quantity of resin and wax should preferably be at least 3% for each ingredient and still more preferably at least 5% for each ingredient based on the weight of the final product.

The following examples illustrate various modes of applying the invention:

EXAMPLE I.—*Modification of viscose with Asiatic wax and diphenylolpropane-formaldehyde resin*

A composition was prepared by mixing 600 grams of viscose (containing 7% cellulose) 21 grams of diphenylolpropane-formaldehyde resin in ethyl alcohol (50 parts ethyl alcohol and 50 parts of resin) and 45 grams of wax emulsion prepared by heating 900 parts of water to 70° C. and, while circulating in a colloid mill, adding 36 parts Monopole oil and 100 parts molten Asiatic wax, the mixture being circulated through the colloid mill for five minutes and then withdrawn. After thorough mixing of the modified viscose and appropriate after-treatment, such as filtration, the modified viscose was spun into filaments by extrusion into a coagulating and regenerating bath conventionally used in the manufacture of regenerated cellulose thread from viscose. Before desulfuring, the yarn was heated at 130° C. for 45 minutes to set up the resin. After desulfuring and thoroughly drying at an elevated temperature, this yarn had a very satisfactory degree of water repellence.

By way of showing the unexpected properties of the modified yarn prepared as described above, with respect to water repellency, 400 grams of viscose (containing 7% cellulose) and 30 grams of wax emulsion prepared as described in the preceding paragraph, were thoroughly mixed, the viscose subjected to suitable after-treatment such as filtration, and spun into filaments in the normal way. After purification and drying, it was found that these filaments were easily wetted by water. Similarly, 400 grams of viscose (containing 7% cellulose) were thoroughly mixed with 14 grams of the 50% diphenylolpropane-formaldehyde resin solution described in the preceding paragraph, and, after appropriate treatment such as filtration, were spun into filaments in a normal manner. Before desulfuring, the filaments were heated to 110° C. for 2½ hours to set up the resin and then desulfured in the usual fashion. After thorough drying at 120° C., these filaments were easily wetted by water.

EXAMPLE II.—*Modification of viscose with rosin and wax*

A modified spinning solution was prepared by thoroughly mixing 400 grams of viscose, 14 grams of 50% rosin solution (in ethyl alcohol) and 21 grams of wax emulsion made up as follows: 7.5 casein was stirred in 100 cc. of hot water for several minutes and finally dissolved by the addition of 7 cc. concentrated ammonium hydroxide. An additional 110 cc. of water was added to this solution, then circulated in a colloid mill at 70° C. to which was then added 35 grams molten Asiatic wax. After circulation through the colloid mill for about one minute, the emulsion was allowed to cool and filtered through cheese cloth. This modified viscose was spun into filaments in the normal fashion and purified. After drying at a temperature of 120° C. for a period of 20 minutes, the filaments were found to possess very good water repellence.

Alternatively, a modified spinning solution was prepared by mixing 400 grams of viscose and 14 grams of 50% solution of rosin (in alcohol). After thorough mixing and appropriate after-treatment, this modified viscose was spun into filaments in a normal fashion. After purification and drying as above, it was found that these modified filaments are easily wetted by water, being in no way superior to ordinary regenerated cellulose filaments.

EXAMPLE III.—*Modification of viscose with Asiatic wax and diphenylolpropane - formaldehyde resin*

This example is essentially identical with Example I, except that the wax emulsion was prepared by the method given in Example II, rather than by the method given in Example I. After setting up the resin as in Example I and appropriate purification and drying, this yarn was found to be quite water repellent.

Although the preferred form of the invention contemplates the modification of viscose, the scope of the invention includes the modification of other cellulosic solutions which, when unmodified, produce water sensitive products (i. e. subject to swelling in water). Examples of such solutions are caustic soda aqueous solutions of lowly substituted ethers such as methyl cellulose and glycol cellulose, of lowly substituted esters such as lowly substituted cellulose acetate, of lowly substituted cellulose glycollic acid or of urea cellulose, or other aqueous alkali solutions of cellulose, these solutions being capable of coagulation in an acid coagulating bath.

In addition to diphenylolpropane-formaldehyde resins (i. e., the resins formed by the condensation of diphenylolpropane and formaldehyde), other resins may be used in conjunction with wax to impart water resistance or water repellency to the cellulosic products. The resins must be soluble in the cellulosic solution and compatible with wax in the proportion in which the wax and resin exist in the final product. Other resins mentioned by way of example, as coming within the broad scope of the invention, are alkali soluble phenol-formaldehyde resin prepared by condensing formaldehyde with a phenol such as xylenol, cresol, hydroxydiphenyl, diphenylolcyclohexane, etc. Aldehydes other than formaldehyde may be used as resin forming agents when condensed with the phenol, e. g., acetaldehyde. It is desirable that the resin be potentially reactive, i. e., be capable of being set up to a permanently insoluble form (i. e., in a form insoluble in water or the ordinary organic solvents) before desulfuring, in the case of viscose, as by a heating step to promote condensation to the insoluble form (see the examples above), the heating of the resin also effecting a melting of the wax whereby to effect suitable blending of the resin and wax. Alternatively, if the resin is not potentially reactive, the filaments should nevertheless be heated above the melting point of the wax in order to promote thorough intermingling of the wax and resin. Of the resins which are not potentially reactive there may be used hydrogenated rosin, modified rosin as described in U. S. Patent to Morton No. 2,017,866, abietyl acid phthalate and similar acid esters.

In addition to Asiatic wax, various other waxes may be used, such as Carnauba wax, or other high melting natural and synthetic waxes including paraffin wax.

The water repellent filaments and threads made in accordance with this invention are useful for many purposes, for example, in the production of fabrics to be used under conditions where water repellence is desirable as in shower curtains, clothing, tent material, etc., in the development of substitutes for "kapok," for use in life preservers, for stuffing in upholstered furniture, for insulation purposes, etc. Fabrics woven from filaments and threads made according to the present invention are also useful in the production of upholstered outdoor furniture subject to exposure in all kinds of weather. Films and pellicles can also be made in accordance with the procedure outlined above for the production of filaments, and are useful in those fields wherein films and pellicles having high water-repellency may be desired.

If the threads are subsequently washed with a medium which will remove the surface wax so that the water-repellency is thereby partially diminished, the fibrous article may again be heated above the melting point of the wax whereupon the water-repellency will be largely regained. This can ordinarily be done by ironing the fabric composed of filaments made according to the present invention.

The cellulosic products produced according to the present invention have very definite advantages over ordinary cellulosic products in that they are water repellent as produced whereas ordinary regenerated cellulosic stuctures or cellulose structures of natural origin, such as cotton, must be given some auxiliary treatment in order to be rendered water repellent.

Any modification or variation of the invention which conforms to the spirit thereof, is intended to be included within the scope of the claims.

I claim:

1. The process of producing a water-repellent cellulosic product which comprises thoroughly commingling in an aqueous cellulosic solution, a wax and a resin soluble in said solution, casting said modified solution into the desired form, and subjecting the resultant product to a temperature above the melting point of the wax for a sufficient period of time to flux said wax.

2. The process of producing a water-repellent cellulosic product which comprises thoroughly commingling in an aqueous cellulosic solution a wax and a wax-compatible resin soluble in said solution, casting said modified solution into the desired form, and subjecting the resultant product to a temperature above the melting point of the wax for a sufficient period of time to flux said wax.

3. The process of producing a water-repellent cellulosic product which comprises commingling a wax and an alkali-soluble resin in an aqueous alkali cellulosic solution, casting said modified solution into the desired form, and subjecting the resultant product to a temperature above the melting point of the wax for a sufficient period of time to flux said wax.

4. The process of producing a water-repellent cellulosic product which comprises thoroughly commingling a wax and a viscose-soluble resin in a viscose solution, casting said modified viscose solution into the desired form, and subjecting the resultant product to a temperature above the melting point of the wax for a sufficient period of time to flux said wax.

5. The process of producing a water-repellent cellulosic product which comprises thoroughly commingling a wax and a potentially reactive, viscose-soluble resin in a viscose solution, casting said modified viscose solution into the desired form, and subjecting the resultant product to a temperature above the melting point of the wax for a sufficient period of time to flux said wax.

6. The process of producing a water-repellent cellulosic product which comprises thoroughly commingling a wax and a viscose-soluble, diphenylolpropane-formaldehyde resin in a viscose solution, casting said modified viscose solution into the desired form, and subjecting the resultant product to a temperature above the melting point of the wax for a sufficient period of time to flux said wax.

7. The process of producing water-repellent cellulosic filaments which comprises thoroughly commingling in an aqueous cellulosic solution a wax and a resin soluble in said solution, spinning said modified solution into filaments, and subjecting said filaments to a temperature above the melting point of the wax for a sufficient period of time to flux said wax.

8. The process of producing water-repellent cellulosic filaments which comprises commingling a wax and an alkali-soluble resin in an aqueous alkali cellulosic solution, spinning said modified solution into filaments, and subjecting said filaments to a temperature above the melting point of the wax for a sufficient period of time to flux said wax.

9. The process of producing water-repellent cellulosic filaments which comprises thoroughly commingling a wax and a viscose-soluble resin in a viscose solution, spinning said modified solution into filaments, and subjecting said filaments to a temperature above the melting point of the wax for a sufficient period of time to flux said wax.

10. The process of producing water-repellent cellulosic filaments which comprises thoroughly commingling a wax and a potentially reactive, viscose-soluble resin in a viscose solution, spinning said modified solution into filaments, and subjecting said filaments to a temperature above the melting point of the wax for a sufficient period of time to flux said wax.

11. The process of producing water-repellent cellulosic filaments which comprises thoroughly commingling a wax and a viscose-soluble, diphenylolpropane-formaldehyde resin in a viscose solution, spinning said modified solution into filaments, and subjecting said filaments to a temperature above the melting point of the wax for a sufficient period of time to flux said wax.

12. A non-fibrous, cellulosic structure-forming composition comprising an aqueous alkali cellulosic solution containing a wax and a resin soluble in said solution.

13. A non-fibrous, cellulosic structure-forming composition comprising an aqueous alkali cellulosic solution containing a wax and a resin soluble in said solution, said resin and wax being compatible with each other.

14. A non-fibrous, cellulosic structure-forming composition comprising a viscose solution containing a wax and a resin soluble in said solution, said resin and wax being compatible with each other.

15. A non-fibrous, cellulosic structure-forming composition comprising a viscose solution containing a wax and a diphenylolpropane-formaldehyde resin soluble in said solution, said resin and wax being compatible with each other.

16. A substantially water-repellent, non-fibrous, solid cellulosic structure obtained from an aqueous cellulosic solution comprising a water-sensitive cellulosic material containing both a resin and a wax distributed throughout the body of said cellulosic material, said resin resulting from a resin which is soluble in the aqueous cellulosic solution from which said cellulosic structure is obtained.

17. A substantially water-repellent, non-fibrous, solid cellulosic structure obtained from an aqueous cellulosic solution comprising a water-sensitive cellulosic material containing both a resin and a wax distributed throughout the body of said cellulosic material, the resin and wax being compatible with each other in the proportions in which they are present in the said cellulosic structure, said resin resulting from a resin which is soluble in the aqueous cellulosic solution from which said cellulosic structure is obtained.

18. A solid regenerated cellulose structure having substantial water-repellency and containing both a resin and a wax distributed throughout the body of the regenerated cellulose.

19. A solid regenerated cellulose structure having substantial water-repellency and containing both a resin and a wax distributed throughout the body of the regenerated cellulose, the resin and wax being compatible with each other in the proportions in which they are present in said cellulosic structure.

20. A solid regenerated cellulose structure having substantial water-repellency and containing both diphenylolpropane-formaldehyde resin and a wax distributed throughout the body of the regenerated cellulose.

21. A solid regenerated cellulose structure having substantial water-repellency and containing both diphenylolpropane-formaldehyde resin and a wax distributed throughout the body of said regenerated cellulose, said resin being insoluble in water or in the ordinary organic solvents.

22. A substantially water-repellent, cellulosic filament obtained from an aqueous cellulosic solution comprising a water-sensitive cellulosic material and containing both a resin and a wax distributed throughout the body of said cellulosic filament, said resin resulting from a resin which is soluble in the aqueous cellulosic solution from which said filament is obtained.

23. A substantially water-repellent, cellulosic filament obtained from an aqueous cellulosic solution comprising a water-sensitive cellulosic material and containing both a resin and a wax distributed throughout the body of said cellulosic filament, the resin and wax being compatible with each other in the proportions in which they are present in said filament, said resin resulting from a resin which is soluble in the aqueous cellulosic solution from which said filament is obtained.

24. A regenerated cellulose filament having substantial water-repellency and containing both a resin and a wax distributed throughout the body of said regenerated cellulose.

25. A regenerated cellulose filament having substantial water-repellency and containing both a resin and a wax distributed throughout the body of said regenerated cellulose, the resin and wax being compatible with each other in the proportions in which they are present in said filament.

EMMETTE F. IZARD.